United States Patent
Agapiou et al.

(10) Patent No.: US 10,655,047 B2
(45) Date of Patent: *May 19, 2020

(54) PLUGGING AND ABANDONING A WELL USING EXTENDED-LIFE CEMENT COMPOSITIONS

(71) Applicant: Halliburton Energy Services, Inc., Houston, TX (US)

(72) Inventors: Kyriacos Agapiou, Houston, TX (US); Thomas Jason Pisklak, Cypress, TX (US); Samuel J. Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/579,590

(22) PCT Filed: Jul. 7, 2015

(86) PCT No.: PCT/US2015/039353
§ 371 (c)(1),
(2) Date: Dec. 4, 2017

(87) PCT Pub. No.: WO2017/007455
PCT Pub. Date: Jan. 12, 2017

(65) Prior Publication Data
US 2018/0163121 A1    Jun. 14, 2018

(51) Int. Cl.
*C09K 8/467* (2006.01)
*E21B 33/13* (2006.01)
(Continued)

(52) U.S. Cl.
CPC .......... *C09K 8/467* (2013.01); *C04B 22/0013* (2013.01); *C04B 22/0093* (2013.01);
(Continued)

(58) Field of Classification Search
CPC ..... C04B 28/06; C04B 24/06; C04B 40/0658; C04B 22/0013; C04B 2103/22;
(Continued)

(56) References Cited

U.S. PATENT DOCUMENTS 7,326,290 B2   2/2008   Guinot et al.
9,227,872 B2   1/2016   Pisklak et al.
(Continued)

FOREIGN PATENT DOCUMENTS

| CA | 2138599 | 6/1995 |
|----|---------|--------|
| CA | 2855982 | 5/2013 |
| KR | 1020100068808 | 6/2010 |

OTHER PUBLICATIONS

Calcium Aluminate Mineral Suspensions, an Innovative Liquid Binder for Construction and Coating Industries, Presented by Pascal Taquet on Mar. 21, 2013.
International Search Report and Written Opinion for Application No. PCT/US2015/039353 dated Mar. 10, 2016.
Examination Report for CA Application No. 2,987,538 dated Jun. 4, 2019.
Examination Report for CA Application No. 2,987,538 dated Feb. 25, 2020.
(Continued)

*Primary Examiner* — Zakiya W Bates
(74) *Attorney, Agent, or Firm* — Thomas Rooney; Corey S. Tumey

(57) ABSTRACT

Methods and systems for plug-and-abandon applications are included. A method comprises providing an extended-life cement composition comprising calcium aluminate cement, water, and a cement set retarder. The method further comprises mixing the extended-life cement composition with a cement set activator to activate the extended-life cement composition, introducing the activated extended-life cement composition into a wellbore, and allowing the activated extended-life cement composition to set in the wellbore to form a plug in the wellbore. The plug has a permeability of less than 0.1 millidarcy.

10 Claims, 7 Drawing Sheets

(51) Int. Cl.
*C04B 28/06* (2006.01)
*C04B 22/00* (2006.01)
*C04B 22/06* (2006.01)
*C04B 22/16* (2006.01)
*C04B 24/06* (2006.01)
*C04B 40/06* (2006.01)
*C04B 103/00* (2006.01)
*C04B 103/12* (2006.01)
*C04B 103/22* (2006.01)

(52) U.S. Cl.
CPC ............ *C04B 22/062* (2013.01); *C04B 22/16* (2013.01); *C04B 24/06* (2013.01); *C04B 28/06* (2013.01); *C04B 40/0658* (2013.01); *E21B 33/13* (2013.01); *C04B 2103/0008* (2013.01); *C04B 2103/12* (2013.01); *C04B 2103/22* (2013.01)

(58) Field of Classification Search
CPC ..... C04B 22/0093; C04B 22/062; C04B 7/02; C09K 8/467; E21B 33/14; E21B 33/13; E21B 33/16; E21B 21/00
See application file for complete search history.

(56) References Cited

U.S. PATENT DOCUMENTS

| | | |
|---|---|---|
| 2005/0155763 A1 | 7/2005 | Reddy et al. |
| 2010/0051275 A1* | 3/2010 | Lewis .................... C04B 28/02 166/286 |
| 2010/0175589 A1 | 7/2010 | Charpentier et al. |
| 2012/0291674 A1 | 11/2012 | Brenneis et al. |
| 2014/0083701 A1 | 3/2014 | Boul et al. |
| 2014/0202698 A1 | 7/2014 | Pisklak et al. |
| 2014/0216746 A1 | 8/2014 | Ballew et al. |
| 2015/0107490 A1* | 4/2015 | Karcher .................. C04B 28/00 106/675 |

OTHER PUBLICATIONS

ASTM Standard C150/C150M. "Standard Specification for Portland Cement", ASTM International, 2019, West Conshohocken, PA.

API Specification 10. "Specification for Materials and Testing for Well Cementing", American Petroleum Institute, Fifth Edition, 1990.

Bear, Jacob. "Dynamics of Fluids in Porous Media", 1972, p. 136, Dover Publications.

* cited by examiner

US 10,655,047 B2

PLUGGING AND ABANDONING A WELL USING EXTENDED-LIFE CEMENT COMPOSITIONS

BACKGROUND

Methods of plugging and abandoning a well and, more particularly, methods of using extended-life cement compositions comprising calcium aluminate cement to plug and abandon a well are provided.

Cement compositions may be used in a variety of subterranean operations. In some instances, extended-life cement compositions have been used. In contrast to conventional cement compositions that set and harden upon preparation, extended-life cement compositions are characterized by being capable of remaining in a pumpable fluid state for about one day or longer (e.g., about 7 days, about 2 weeks, about 2 years or more) at room temperature (e.g., about 80° F.) in storage. When desired for use, the extended-life cement compositions should be capable of activation and consequently develop reasonable compressive strengths. For example, an extended-life cement composition that is activated may set into a hardened mass. Among other things, extended-life cement compositions may be suitable for use in operations where it is desirable to prepare the cement composition in advance. This may allow the extended-life cement composition to be stored prior to use. In addition, this may allow the extended-life cement composition to be prepared at a convenient location before transportation to the job site. Accordingly, capital expenditures may be reduced due to a reduction in the need for on-site bulk storage and mixing equipment. This may be particularly useful for offshore operations where space onboard the vessels may be limited.

In cementing methods, such as plug-and-abandon operations, a plug may be formed in a wellbore to seal off the wellbore for abandonment. In performing plug-and-abandon operations, a cement composition may be placed in the wellbore at a desired depth. The cement composition should set in the wellbore, forming a hardened mass (e.g., a plug) that seals off selected intervals of the wellbore. The mass may prevent and/or reduce zonal communication and migration of fluids that may contaminate water-containing formations. It may desirable in certain instances to form one or more plugs in the wellbore adjacent to hydrocarbon-producing formations and water-containing formations.

In conventional offshore plug-and-abandon operations, equipment may be used to prepare the plugging composition and to separate the raw materials. This equipment may be transported to the offshore facility and the equipment can require additional personnel to operate. These additional requirements can increase expenditures and operation

BRIEF DESCRIPTION OF THE DRAWINGS

These drawings illustrate certain aspects of some of the embodiments of the present method, and should not be used to limit or define the method.

DETAILED DESCRIPTION

Figure 1:
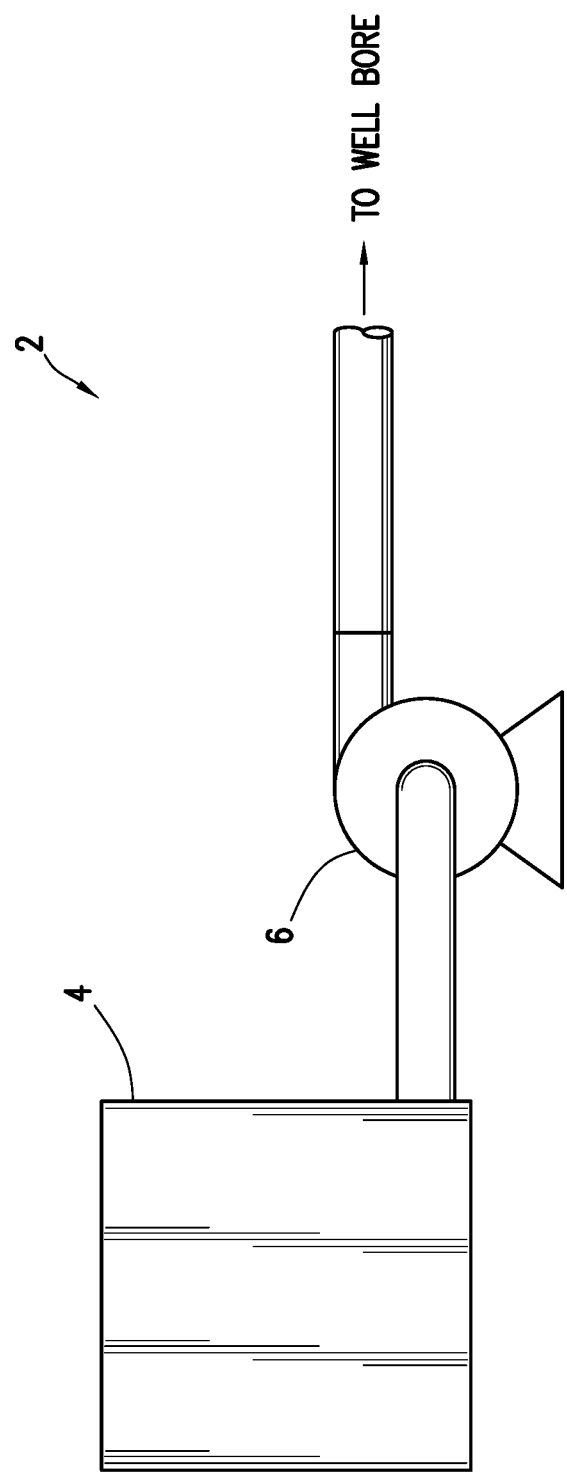
FIG. 1 illustrates an example system for the preparation and delivery of an extended-life cement composition into a wellbore.

Methods of plugging and abandoning a well and, more particularly, methods of using extended-life cement compositions comprising calcium aluminate cement to plug and abandon a well are provided.

The extended-life cement compositions may comprise calcium aluminate cement, a cement set retarder, and water. Optionally, the extended-life cement compositions may comprise a cement set activator, a cement set accelerator, and/or a dispersant. Advantageously, the extended-life cement compositions may be capable of remaining in a pumpable fluid state for an extended period of time, i.e., they may be capable of remaining in a pumpable fluid state for about one day or longer (e.g., about 7 days, about 2 weeks, about 2 years or more) at room temperature (e.g., about 80° F.) in storage. Generally, the extended-life cement compositions may develop compressive strength after activation. Advantageously, the extended-life cement compositions may develop reasonable compressive strengths at relatively low temperatures (e.g., temperatures of about 70° F. or less to about 140° F.). Thus, while the extended-life cement compositions may be suitable for a number of types of subterranean formations, they may be particularly suitable for use in subterranean formations having relatively low bottom hole static temperatures, e.g., temperatures of about 70° F. or less to about 140° F. Alternatively, the extended-life cement compositions may be used in subterranean formations having bottom hole static temperatures up to 450° F. or higher.

The extended-life cement compositions may comprise a calcium aluminate cement. Any calcium aluminate cement may be suitable for use. Calcium aluminate cements may be described as cements that comprise calcium aluminates in an amount greater than 50% by weight of the dry calcium aluminate cement (i.e., the calcium aluminate cement before water or any additives are added). A calcium aluminate may be defined as any calcium aluminate including, but not limited to, monocalcium aluminate, monocalcium dialuminate, tricalcium aluminate, dodecacalcium hepta-aluminate, monocalcium hexa-aluminate, dicalcium aluminate, pentacalcium trialuminate, tetracalcium trialuminate, and the like. One example of a suitable such calcium aluminate is SECAR 71® calcium aluminate, which is commercially available from Kerneos' Aluminate Technologies. Without limitation, the calcium aluminate cement may be included in the extended-life cement compositions in an amount in the range of from about 10% to about 80% by weight of the extended-life cement compositions. For example, the calcium aluminate cement may be present in an amount ranging between any of and/or including any of about 10%, about 15%, about 20%, about 25%, about 30%, about 35%, about 40%, about 45%, about 50%, about 55%, about 60%, about 65%, about 70%, about 75%, or about 80% by weight of the extended-life cement composition. One of ordinary skill in the art, with the benefit of this disclosure, should be able to choose an appropriate type of calcium aluminate cement and should recognize the appropriate amount of the calcium aluminate cement to include for a chosen application.

The extended-life cement compositions may comprise a cement set retarder. Examples of the cement set retarder may include, but should not be limited, to hydroxycarboxylic acids such as citric, tartaric, gluconic acids or their respective salts, boric acid or its respective salt, and combinations thereof. A commercial example of a suitable cement set retarder is Fe-2™ Iron Sequestering Agent available from Halliburton Energy Services, Inc., Houston, Tex. Generally, the cement set retarder may be present in the extended-life cement compositions in an amount sufficient to delay the setting for a desired time. Without limitation, the cement set retarder may be present in the extended-life cement compositions in an amount in the range of from about 0.01% to about 10% by weight of the calcium aluminate cement. More particularly, the cement set retarder may be present in an amount ranging between any of and/or including any of about 0.01%, about 0.1%, about 1%, about 2%, about 4%, about 6%, about 8%, or about 10% by weight of the calcium aluminate cement. Additionally, it is important to use cement set retarders that do not undesirably affect the extended-life cement compositions, for example, by increasing the pH of the extended-life cement compositions unless desired. One of ordinary skill in the art, with the benefit of this disclosure, should be able to choose an appropriate type of cement set retarder and should recognize the appropriate amount of the cement set retarder to include for a chosen application.

The extended-life cement compositions may comprise water. The water may be from any source provided that it does not contain an excess of compounds that may undesirably affect other components in the extended-life cement compositions, for example, the water may not contain that raise the alkalinity of the extended-life cement compositions unless it is desirable to do so. The water may comprise fresh water or salt water. Salt water generally may include one or more dissolved salts therein and may be saturated or unsaturated as desired for a particular application. Seawater or brines may be suitable for use in some applications. Further, the water may be present in an amount sufficient to form a pumpable composition. Without limitation, the water may be present in the extended-life cement compositions in an amount in the range of from about 20% to about 90% by weight of the extended-life cement composition. For example, the water may be present in an amount ranging between any of and/or including any of about 20%, about 25%, about 30%, about 35%, about 40%, 45%, about 50%, about 55%, about 60%, about 65%, about 70%, about 75%, about 80%, about 85%, or about 90% by weight of the extended-life cement composition. One of ordinary skill in the art, with the benefit of this disclosure, should be able to recognize the appropriate amount of water to include for a chosen application.

The extended-life cement compositions may optionally comprise a cement set activator when it is desirable to induce setting of the extended-life cement compositions. Certain cement set activators may additionally function as cement set accelerators and may accelerate the development of compressive strength in the extended-life cement compositions in addition to activating the extended-life cement compositions. A cement set activator may include any alkaline species that increases the pH of the extended-life cement compositions sufficiently to initiate hydration reactions in the extended-life cement compositions, but also does not otherwise interfere with the setting of the extended-life cement compositions. Without being limited by theory, it is believed that activation may be induced due to the cement set activator removing the hydration barrier caused by the cement set retarders in the extended-life cement compositions. Moreover, the large exotherm associated with the setting of the calcium-aluminate cement is believed to provide a large enough temperature increase that the extended-life cement compositions may be able to set at temperatures much lower than other types of extended-life cement compositions. Potential examples of cement set activators may include, but should not be limited to: Groups IA and IIA hydroxides such as sodium hydroxide, magnesium hydroxide, and calcium hydroxide; alkaline aluminates such as sodium aluminate; Portland cement; and the like. Without limitation, the cement set activator may be present in the extended-life cement compositions in an amount in the range of from about 0.01% to about 10% by weight of the calcium aluminate cement. More particularly, the cement set activator may be present in an amount ranging between any of and/or including any of about 0.01%, about 0.1%, about 1%, about 2%, about 4%, about 6%, about 8%, or about 10% by weight of the calcium aluminate cement.

As discussed above, the cement set activators may comprise calcium hydroxide which may be referred to as hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included, for example, to activate the extended-life cement compositions.

As discussed above, the cement set activator may comprise a Portland cement. Examples of such Portland cements, include, but are not limited to Classes A, C, H, or G cements according to the American Petroleum Institute, *API Specification for Materials and Testing for Well Cements*, API Specification 10, Fifth Ed., Jul. 1, 1990. In addition, the Portland cement may include Portland cements classified as ASTM Type I, II, III, IV, or V.

In some examples, it may be desirable to delay the release of the cement set activator. In such examples, the cement set activator may be combined with a binder to produce a delayed-release cement set activator. The binder may be used to provide structure for which to hold cement set activator in one or more masses to allow for the cement set activator to be portioned out. Suitable binders may include, but are not limited to, silica gel, aluminosilicate, chitosan, and cellulose, derivatives thereof, and combinations thereof. The amount of binder used is dependent upon the chosen cement set activator and the desired degree to which the chosen cement set activator is to be bound.

The cement set activator and binder may be combined to form a slurry or paste, and then allowed to dry and harden to form the delayed-release cement set activator. Once in a hardened form, the delayed-release cement set activator may be cut or broken into small particles and sized with a sieve. Generally, the particles should have a size that allows for the particles to be transportable into a subterranean formation and mixed with extended-life cement composition. In some examples, the particles may have a size in a range of about 30 mesh to about 80 mesh. Mesh, as used herein, refers to U.S. standard size mesh.

Due to the bound nature of this sized-particulate form of the delayed-release cement set activator, the delayed-release cement set activator may be released slowly and thus activate the extended-life cement composition at a slower rate relative to a cement set activator that has not been combined with a binder. In some examples, the release of the delayed-release cement set activator may be further delayed by encapsulating the bound cement set activator with an outer coating (e.g., a degradable coating that degrades downhole) that further impairs the release of the delayed-release cement set activator. As used herein, the term "coating," or "outer coating" and the like, does not imply any particular degree of coating on the particulate. In particular, the terms "coat" or "coating" do not imply 100% coverage by the coating on the particulate. In some embodiments, an outer coating, including degree of coating, may be used to control the rate of release of the delayed-release cement set activator. For example, in a specific example, the outer coating may be configured to impair the release of the delayed-release cement set activator until the extended-life cement composition is in the portion of the subterranean formation to be cemented, wherein the outer coating may degrade due to elevated temperatures within the subterranean formation and the delayed-release cement set activator may be released throughout the extended-life cement composition. The time period for delay of the release of the cement set activator may be in a range between any of and/or including any of about 1 minute to about 24 hours. For example, the time period for the delay of release may be in a range between any of and/or including any of about 1 minute, about 5 minutes, about 30 minutes, about 1 hour, about 6 hours, about 12 hours, or about 24 hours. Operational factors such as pump rate, conduit dimensions, and the like may influence the time period for delay.

The outer coating may be formed of a water-insoluble material with a melting point, for example, of from about 100° F. to about 500° F. A water insoluble material may prevent the outer coating from dissolving in the extended-life cement compositions until desired. Suitable outer coating materials may include, but should not be limited to, polysaccharides such as dextran and cellulose, chitins, lipids, latex, wax, chitosans, proteins, aliphatic polyesters, poly(lactides), poly(glycolides), poly(ε-caprolactones), poly(hydroxybutyrates), poly(anhydrides), aliphatic polycarbonates, orthoesters, poly(orthoesters), poly(amino acids), poly(ethylene oxides), polyphosphazenes, derivatives thereof, copolymers thereof, or a combination thereof.

The delayed-release cement set activator (with or without outer coating) may slowly degrade or disassociate in the extended-life cement compositions. This may result in changing the pH of the extended-life cement composition downhole. The release of the pH altering component from the delayed-release cement set activator may be controlled by time and/or temperature. The delayed-release cement set activator may be formulated to release the pH altering component over time in the wellbore or once the delayed-release cement set activator is exposed to a certain temperature within the wellbore. Because of these adjustable properties, a delayed-release cement set activator may be added to the extended-life cement compositions before and/or during storage, whereas cement set-activators which do not comprise a delayed-release may only be added to an extended-life cement compositions as the extended-life cement composition is introduced into the subterranean formation or after the extended-life cement composition has been introduced into the subterranean formation. As such, the delayed-release cement set activator may be dry blended with the extended-life cement composition and stored, or may be added to an extended-life cement composition slurry and stored. In these specific examples, the additional mixing steps of adding a nondelayed-release cement set activator may be eliminated, and storage and mixing operations may be simplified as a result. If desired, the delayed-release cement set activator may also be added to the extended-life cement composition immediately before introducing the extended-life cement composition into the subterranean formation, or alternatively, the delayed-release cement set activator may be added to the extended-life cement composition as the extended-life cement composition is introduced into the subterranean formation.

The extended-life cement compositions may optionally comprise a lithium salt which may function as cement set accelerator. A cement set accelerator may accelerate the development of compressive strength once an extended-life cement composition has been activated, but the cement set accelerator, unless otherwise noted, does not itself induce activation of the extended-life cement composition. Examples of suitable lithium salts include, without limitation, lithium sulfate and lithium carbonate. Without being limited by theory, it is believed that the lithium ions increase the number of nucleation sites for hydrate formation in the calcium aluminate cement. Thus, when the calcium aluminate cement is activated by combination with cement set activator, the presence of the lithium salts may accelerate the development of compressive strength of the calcium aluminate cement. Preferably, the lithium salt should be added only to retarded or dormant calcium aluminate cements. Introduction of a lithium salt to a non-retarded or non-dormant calcium aluminate cement may increase the alkalinity of the calcium aluminate cement by a large enough magnitude to induce premature setting of the calcium aluminate cement, based of course, on the specific calcium aluminate cement used and the other components in in the composition. However, lithium salts added to retarded or dormant calcium aluminate cements may prevent this risk. Without limitation, the lithium salt may be included in the extended-life cement compositions in an amount in the range of about 0.01% to about 10% by weight of the calcium aluminate cement. More particularly, the lithium salt may be present in an amount ranging between any of and/or including any of about 0.01%, about 0.1%, about 0.5%, about 1%, about 2%, about 3%, about 4%, about 5%, or about 10% by weight of the calcium aluminate cement. One of ordinary skill in the art, with the benefit of this disclosure, should recognize the appropriate amount of lithium salt to include for a chosen application.

As previously mentioned, the extended-life cement compositions may optionally comprise a dispersant. Examples of suitable dispersants may include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Additionally, polyoxyethylene phosphonates and polyox polycarboxylates may be used. Other suitable dispersants may be polycarboxylated ether dispersants such as Liquiment 5581F and Liquiment® 514 L dispersants available from BASF Corporation Houston, Tex.; or Ethacryl™ G dispersant available from Coatex, Genay, France. An additional example of a suitable commercially available dispersant is CFR™-3 dispersant, available from Halliburton Energy Services, Inc., Houston, Tex.

The Liquiment® 514 L dispersant may comprise 36% by weight of the polycarboxylated ether in water.

While a variety of dispersants may be used, some dispersants may, for example, be used with specific cement set retarders. Additionally, dispersants may be used that do not undesirably affect the extended-life cement compositions, for example, by inducing premature setting. One of ordinary skill in the art, with the benefit of this disclosure, should recognize the appropriate type of dispersant to include for a chosen application.

Without limitation, the dispersant may be included in the extended-life cement compositions in an amount in the range of from about 0.01% to about 5% by weight of the calcium aluminate cement. More particularly, the dispersant may be present in an amount ranging between any of and/or including any of about 0.01%, about 0.1%, about 0.5%, about 1%, about 2%, about 3%, about 4%, or about 5% by weight of the calcium aluminate cement. One of ordinary skill in the art, with the benefit of this disclosure, will recognize the appropriate amount of dispersant to include for a chosen application.

The extended-life cement compositions may comprise a polyphosphate. Any polyphosphate-containing compound, phosphate salt, or the like may be sufficient. Examples of polyphosphates may include sodium polyphosphates, such as sodium hexametaphosphate, sodium polytriphosphate; potassium polyphosphates, such as potassium tripolyphosphate, the like, or a combination thereof. A commercial example of a suitable polyphosphate is CALGON® sodium polyphosphate, available from CALGON CARBON CORPORATION®, Pittsburgh, Pa. The polyphosphate may be added to the other components of the extended-life cement composition as an aqueous solution. Alternatively, the polyphosphate may be added to the other components of the extended-life cement composition as a dry solid, or as dry solid particles. The polyphosphate may be included in the extended-life cement compositions in an amount desirable for a particular application as will be evident to those of ordinary skill in the art with the benefit of this disclosure. For example, the polyphosphate may be present in the extended-life cement compositions an amount of about 0% to about 30% by weight of the extended-life cement compositions. For example, the polyphosphate may be present in an amount ranging between any of and/or including any of about 0%, about 5%, about 10%, about 15%, about 20%, about 25%, or about 30% by weight of the extended-life cement composition. One of ordinary skill in the art, with the benefit of this disclosure, should be able to choose an appropriate type of polyphosphate and should recognize the appropriate amount of the polyphosphate to include for a chosen application.

The extended-life cement compositions may optionally comprise a filler material. The filler material used for the extended-life cement compositions may comprise any suitable filler material, provided said filler material does not undesirably raise the alkalinity of the extended-life cement compositions as an increase in alkalinity may induce the premature setting of the extended-life cement compositions. Without limitation, the filler material may include silica, sand, fly ash, or silica fume. Generally, the filler material may be present in the extended-life cement compositions in an amount sufficient to make the system economically competitive. Without limitation, the filler material may be present in the extended-life cement compositions in an amount in the range of from about 0.01% to about 100% by weight of the calcium aluminate cement. More particularly, the filler material may be present in an amount ranging between any of and/or including any of about 0.01%, about 0.1%, about 1%, about 10%, about 25%, about 50%, about 75%, or about 100% by weight of the calcium aluminate cement. One of ordinary skill in the art, with the benefit of this disclosure, should recognize the appropriate amount of filler material to include for a chosen application.

The extended-life cement compositions may optionally comprise a viscosifier. The viscosifier may be included to optimize fluid rheology and to stabilize the suspension. Without limitation, examples of viscosifiers include synthetic polymers; swellable clays such as bentonite; inorganic particulates such as microsand, glass beads, and/or manganese oxide; or biopolymers such as cellulose derivatives (e.g., hydroxyethyl cellulose, carboxymethyl cellulose, carboxymethyl hydroxyethyl cellulose). An example of a commercially available viscosifier is SA-1015' Suspending Agent available from Halliburton Energy Services, Inc., Houston, Tex. Without limitation, the viscosifier may be included in the extended-life cement compositions in an amount in the range of from about 0.01% to about 0.5% by weight of the calcium aluminate cement. In specific embodiments, the viscosifier may be present in an amount ranging between any of and/or including any of about 0.01%, about 0.05%, about 0.1%, about 0.2%, about 0.3%, about 0.4%, or about 0.5% by weight of the calcium aluminate cement. One of ordinary skill in the art, with the benefit of this disclosure, will recognize the appropriate type and amount of viscosifier to include for a chosen application.

Other additives suitable for use in subterranean cementing operations may also be added to the extended-life cement compositions as deemed appropriate by one of ordinary skill in the art. Examples of such additives include, but are not limited to, weighting agents, lightweight additives, gas-generating additives, mechanical property enhancing additives, lost-circulation materials, defoaming agents, foaming agents, thixotropic additives, and combinations thereof. Specific examples of these, and other, additives include silica (e.g., crystalline silica, amorphous silica, fumed silica, etc.), salts, fibers, hydratable clays, shale (e.g., calcined shale, vitrified shale, etc.), microspheres, diatomaceous earth, natural pozzolan, resins, latex, combinations thereof, and the like. Other optional additives may also be included, including, but not limited to, cement kiln dust, lime kiln dust, fly ash, slag cement, shale, zeolite, metakaolin, pumice, perlite, lime, silica, rice husk ash, small-particle size cement, combinations thereof, and the like. A person having ordinary skill in the art, with the benefit of this disclosure, should be able to determine the type and amount of additive useful for a particular application and desired result.

Weighting agents are typically materials that weigh more than water and may be used to increase the density of the extended-life cement compositions. By way of example, weighting agents may have a specific gravity of about 2 or higher (e.g., about 2, about 4, etc.). Examples of weighting agents that may be used include, but are not limited to, hematite, hausmannite, and barite, and combinations thereof. Specific examples of suitable weighting agents include HI-DENSE® weighting agent, available from Halliburton Energy Services, Inc.

Lightweight additives may be included in the extended-life cement compositions to, for example, decrease the density of the extended-life cement compositions. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Gas-generating additives may be included in the extended-life cement compositions to release gas at a predetermined time, which may be beneficial to prevent gas migration from the formation through the extended-life cement composition before it hardens. The generated gas may combine with or inhibit the permeation of the extended-life cement composition by formation gas. Examples of suitable gas-generating additives include, but are not limited to, metal particles (e.g., aluminum powder) that react with an alkaline solution to generate a gas.

Mechanical-property-enhancing additives may be included in the extended-life cement compositions to, for example, ensure adequate compressive strength and long-term structural integrity. These properties can be affected by the strains, stresses, temperature, pressure, and impact effects from a subterranean environment. Examples of mechanical property enhancing additives include, but are not limited to, carbon fibers, glass fibers, metal fibers, mineral fibers, silica fibers, polymeric elastomers, and latexes.

Lost-circulation materials may be included in the extended-life cement compositions to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, plastic laminates (Formica® laminate), corncobs, and cotton hulls.

Defoaming additives may be included in the extended-life cement compositions to, for example, reduce the tendency for the extended-life cement compositions to foam during mixing and pumping of the extended-life cement compositions. Examples of suitable defoaming additives include, but are not limited to, polyol silicone compounds. Suitable defoaming additives are available from Halliburton Energy Services, Inc., under the product name D-AIR™ defoamers.

Foaming additives (e.g., foaming surfactants) may be included in the extended-life cement compositions to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Houston, Tex.

Thixotropic additives may be included in the extended-life cement compositions to, for example, provide an extended-life cement composition that may be pumpable as a thin or low viscosity fluid, but when allowed to remain quiescent attains a relatively high viscosity. Among other things, thixotropic additives may be used to help control free water, create rapid gelation as the composition sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

Those of ordinary skill in the art will appreciate that the extended-life cement compositions generally should have a density suitable for a particular application. By way of example, the extended-life cement compositions may have a density in the range of from about 4 pounds per gallon ("lb/gal") to about 20 lb/gal. By way of example, the extended-life cement compositions may have a density in the range of from about 8 lb/gal to about 17 lb/gal. Without limitation, the extended-life cement compositions may be foamed or unfoamed or may comprise other means to reduce their densities, such as hollow microspheres, low-density elastic beads, or other density-reducing additives known in the art. The density may be reduced after storage, but prior to placement in a subterranean formation. In embodiments, weighting agents may be used to increase the density of the extended-life cement compositions. Examples of suitable weighting agents may include barite, hematite, hausmannite, calcium carbonate, siderite, ilmenite, or combinations thereof. Without limitation, the weighting agents may have a specific gravity of about 3 or greater. Those of ordinary skill in the art, with the benefit of this disclosure, will recognize the appropriate density required for a particular application.

As previously mentioned, the extended-life cement compositions may have a delayed set in that they may be capable of remaining in a pumpable fluid state for about one day or longer (e.g., about 1 day, about 2 weeks, about 2 years or more) at room temperature (e.g., about 80° F.) in storage. For example, the extended-life cement compositions may remain in a pumpable fluid state for a period of time from about 1 day to about 7 days or more. In some embodiments, the extended-life cement compositions may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, Recommended Practice for Testing Well Cements, First Edition, Jul. 2005.

As discussed above, when desired for use, the extended-life cement compositions may be activated (e.g., by addition of a cement set activator) to set into a hardened mass. The term "activate", as used herein, refers to the activation of an extended-life cement composition and in certain cases may also refer to the acceleration of the setting of an extended-life cement composition if the mechanism of said activation also accelerates the development of compressive strength. By way of example, a cement set activator may be added to an extended-life cement composition to activate the extended-life cement composition. Without limitation, an extended-life cement composition that has been activated may set to form a hardened mass in a time period in the range of from about 1 hour to about 12 days. For example, activated extended-life cement compositions may set to form a hardened mass in a time period ranging between any of and/or including any of about 1 hour, about 6 hours, about 12 hours, about 1 day, about 2 days, about 4 days, about 6 days, about 8 days, about 10 days, or about 12 days.

The extended-life cement compositions may set to have a desirable compressive strength after activation. Compressive strength is generally the capacity of a material or structure to withstand axially directed pushing forces. The compressive strength may be measured at a specified time after the activation of the extended-life cement compositions while the extended-life cement composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ Ultrasonic Cement Analyzer, available from Fann Instrument Company, Houston, Tex. Compressive strength values may be determined in accordance with API RP 10B-2, *Recommended Practice for Testing Well Cements*, First Edition, Jul. 2005.

By way of example, extended-life cement compositions that have been activated may develop a 24-hour compressive strength in the range of from about 50 psi to about 5000 psi, alternatively, from about 100 psi to about 4500 psi, or alternatively from about 500 psi to about 4000 psi. In particular, the extended-life cement compositions may develop a compressive strength in 24 hours of at least about 50 psi, at least about 100 psi, at least about 500 psi, or more. The compressive strength values may be determined using destructive or non-destructive methods at any temperature, however compressive strength development at temperatures ranging from 70° F. to 140° F. may be of particular importance for potential use in subterranean formations having relatively low bottom hole static temperatures.

In some examples, the extended-life cement compositions may have desirable thickening times. Thickening time typically refers to the time a fluid, such as an extended-life cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70Bc and may be reported as the time to reach 70Bc. Without limitation, the extended-life cement compositions may have thickening times greater than about 1 hour, alternatively, greater than about 2 hours, greater than about 15 hours, greater than about 30 hours, greater than about 100 hours, or alternatively greater than about 190 hours at 3,000 psi and temperatures in a range of from about 50° F. to about 450° F., alternatively, in a range of from about 70° F. to about 140° F., and alternatively at a temperature of about 100° F. As will be illustrated in the examples below, thickening times may be controlled by the degree to which the pH of the extended-life cement compositions is increased. This is related, to a degree, to the concentration of the cement set activator and allows for a quantitative method of controlling the set time of the extended-life cement compositions.

As will be appreciated by those of ordinary skill in the art, the extended-life cement compositions may be used in plug-and-abandon operations. For example, an extended-life cement composition may be provided that comprises a calcium aluminate cement, water, a cement set retarder, and optionally a dispersant, cement set accelerator, and/or a filler material. When desired for use, the extended-life cement composition may be pumped downhole where it may be introduced into a subterranean formation and allowed to set therein. As used herein, introducing the extended-life cement composition into a subterranean formation includes introduction into any portion of the subterranean formation, including, without limitation, into a wellbore drilled into the subterranean formation, into a near wellbore region surrounding the wellbore, or into both.

The extended-life cement compositions may be used for onshore or offshore plug-and-abandon applications. Extended-life cement compositions may be used instead of traditional plugging compositions in certain applications (e.g., offshore applications) because extended-life cement compositions may require less equipment and personnel to use, which may be particularly advantageous in operations where space is limited. An example of a method for plugging and abandoning a well may comprise placing an extended-life cement composition in a selected plug location in a wellbore and allowing the extended-life cement composition to set to form a plug. The plug location may be selected so that the wellbore can be sealed off for abandonment. For example, the plug location may be selected so that a selected interval of the wellbore may be sealed. In an example, the selected location may be adjacent to a hydrocarbon-containing formation or a water-containing formation. In an example, the plugging and abandoning operation may include the formation of two or more plugs in the wellbore. For example, a method may further include the placement of a second extended-life cement composition in another selected plug location in the wellbore. Additionally, the method may comprise use of any such pump that is sufficient for placement of the extended-life cement compositions for a given application. Moreover certain applications may comprise wireline operated dump bailers.

In some examples, a cement plug may be formed with an extended-life cement composition. The cement plug may have a low permeability. As used herein, low permeability is defined as a plug with a permeability of about 0.1 millidarcy ("mD") or less. A cement plug with low permeability may be particularly suitable for preventing the migration of fluids and gas.

Additional applications may include storing the extended-life cement compositions. For example, an extended-life cement composition may be provided that comprises a calcium aluminate cement, water, a cement set retarder, a cement set activator, and optionally a dispersant, cement set accelerator, and/or a filler material. The extended-life cement composition may be stored in a vessel or other suitable container. The extended-life cement composition may be stored and then pumped downhole when ready for use. The extended-life cement composition may be permitted to remain in storage for a desired time period. For example, the extended-life cement composition may remain in storage for a time period of about 1 day, about 2 weeks, about 2 years, or longer. For example, the extended-life cement composition may remain in storage for a time period of about 1 day, about 2 days, about 5 days, about 7 days, about 10 days, about 20 days, about 30 days, about 40 days, about 50 days, about 60 days, or up to about 2 years. When desired for use, the extended-life cement composition may be introduced into a subterranean formation and allowed to set therein.

A method of treating a well may be provided. The method may include one or all of the components and/or steps illustrated in FIGS. 1-8. The method may comprise providing an extended-life cement composition comprising calcium aluminate cement, water, and a cement set retarder;

mixing the extended-life cement composition with a cement set activator to activate the extended-life cement composition; introducing the activated extended-life cement composition into a wellbore; and allowing the activated extended-life cement composition to set in the wellbore to form a plug in the wellbore that has a permeability of less than 0.1 millidarcy. The cement set retarder may be selected from the group consisting of hydroxycarboxylic acids or their respective salts, boric acid or its respective salt, and any combination thereof. The cement set retarder may be present in an amount of about 0.01% to about 10% by weight of the extended-life cement composition. The composition may further comprise a polyphosphate. The polyphosphate may be sodium hexametaphosphate. The polyphosphate may be present in an amount of about 1% to about 30% by weight of the extended-life cement composition. The cement set activator may be selected from the group consisting of Groups IA and IIA hydroxides, alkaline aluminates, Portland cement, and any combination thereof; wherein the cement set activator is present in an amount of about 0.01% to about 10% by weight of the extended-life cement composition. The extended-life cement composition may further comprise at least one lithium salt selected from the group consisting of lithium sulfate, lithium carbonate, and any combination thereof. The method may further comprise storing the extended-life cement composition in a vessel for a time period of about 1 day or longer prior to the step of mixing. The method may further comprise storing the extended-life cement composition in a vessel for a time period of about 7 days or longer prior to the step of mixing. The subterranean formation adjacent to the plug may have a temperature of about 100° F. or less.

A method of treating a well may be provided. The method may include one or all of the components and/or steps illustrated in FIGS. 1-8. The method may comprise providing an extended-life cement composition comprising calcium aluminate cement, water, and a cement set retarder; storing the extended-life cement composition for a period of about 1 day or longer; mixing the extended-life cement composition with a cement set activator to activate the extended-life cement composition; introducing the activated extended-life cement composition into a wellbore; and allowing the activated extended-life cement composition to set in the wellbore to form a plug in the wellbore that has a permeability of less than 0.1 millidarcy. The cement set retarder may be selected from the group consisting of hydroxycarboxylic acids or their respective salts, boric acid or its respective salt, and any combination thereof. The cement set retarder may be present in an amount of about 0.01% to about 10% by weight of the extended-life cement composition. The composition may further comprise a polyphosphate. The polyphosphate may be sodium hexametaphosphate. The polyphosphate may be present in an amount of about 1% to about 30% by weight of the extended-life cement composition. The cement set activator may be selected from the group consisting of Groups IA and IIA hydroxides, alkaline aluminates, Portland cement, and any combination thereof; wherein the cement set activator is present in an amount of about 0.01% to about 10% by weight of the extended-life cement composition. The extended-life cement composition may further comprise at least one lithium salt selected from the group consisting of lithium sulfate, lithium carbonate, and any combination thereof. The method may further comprise storing the extended-life cement composition in a vessel for a time period of about 7 days or longer prior to the step of mixing. The subterranean formation adjacent to the plug may have a temperature of about 100° F. or less.

A system for plug-and abandon operations may be provided. The system may include one or all of the components illustrated in FIGS. 1-8. The system may comprise an extended-life cement composition comprising: calcium aluminate cement, water, a cement set retarder; a cement set activator mixing equipment for mixing the extended-life cement composition and the cement set activator to produce an activated extended-life cement composition, and a cement delivery system for delivering the activated extended-life cement composition to a selected location for a plug in a wellbore. The system may further comprise a vessel capable of storing the extended-life cement composition. The delivery equipment for delivering the activated extended-life cement composition may comprise pumping equipment and/or a dump bailer. The cement set retarder may be selected from the group consisting of hydroxycarboxylic acids or their respective salts, boric acid or its respective salt, and any combination thereof. The cement set retarder may be present in an amount of about 0.01% to about 10% by weight of the extended-life cement composition. The composition may further comprise a polyphosphate. The polyphosphate may be sodium hexametaphosphate. The polyphosphate may be present in an amount of about 1% to about 30% by weight of the extended-life cement composition. The cement set activator may be selected from the group consisting of Groups IA and IIA hydroxides, alkaline aluminates, Portland cement, and any combination thereof; wherein the cement set activator is present in an amount of about 0.01% to about 10% by weight of the extended-life cement composition. The extended-life cement composition may further comprise at least one lithium salt selected from the group consisting of lithium sulfate, lithium carbonate, and any combination thereof. The system may further comprise a vessel for storing the extended-life cement composition.

Referring now to FIG. 1, the preparation of an example extended-life cement composition will now be described for plug-and-abandon applications. FIG. 1 illustrates a system 2 for the preparation of an extended-life cement composition and subsequent delivery of the extended-life cement composition to a wellbore. As shown, extended-life cement composition may be mixed in mixing equipment 4, such as a jet mixer, re-circulating mixer, or a batch mixer, for example, and then pumped via pumping equipment 6 to the wellbore. Without limitation, the mixing equipment 4 and the pumping equipment 6 may be disposed on one or more cement trucks as will be apparent to those of ordinary skill in the art. Without limitation, a jet mixer may be used, for example, to continuously mix the extended-life cement composition the cement set activator as it is being pumped to the wellbore. In some examples, a re-circulating mixer and/or a batch mixer may be used to mix the extended-life cement composition, and the cement set activator may be added to the mixer as a powder prior to pumping the extended-life cement composition downhole. In offshore operations where rig space may be limited, the extended-life cement composition may be prepared onshore and delivered to the well site in fit-for-purpose delivery tanks.

Figure 2A:
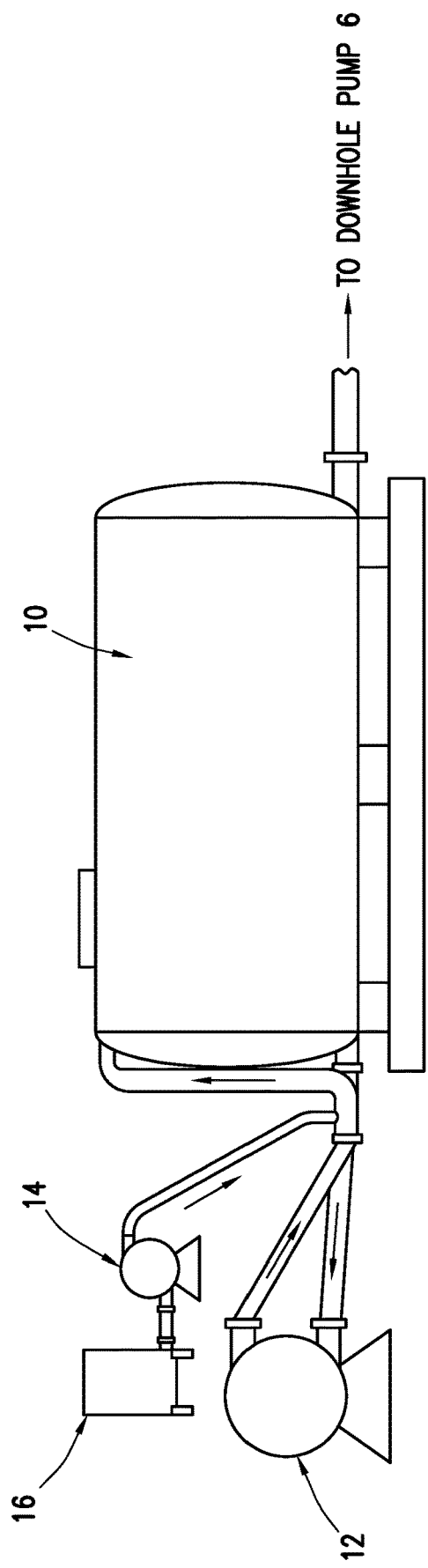
FIG. 2A illustrates an example liquid storage vessel that may be used in the delivery of an extended-life cement composition into a wellbore.

Referring now to FIG. 2A, the delivery system for some examples may include a liquid storage vessel 10 with a detached circulating pump 12, additive skid 14, and additive tank 16. The detached circulating pump 12 may be used to re-circulate the extended-life cement composition in the liquid storage vessel 10. The additive skid 14 (which may include a pump, for example) may be used to deliver additives (e.g., a cement set activator, cement set accelerator, dispersant, etc.) from additive tank 16 to the extended-life cement composition in the liquid storage vessel 10.

Figure 2B:
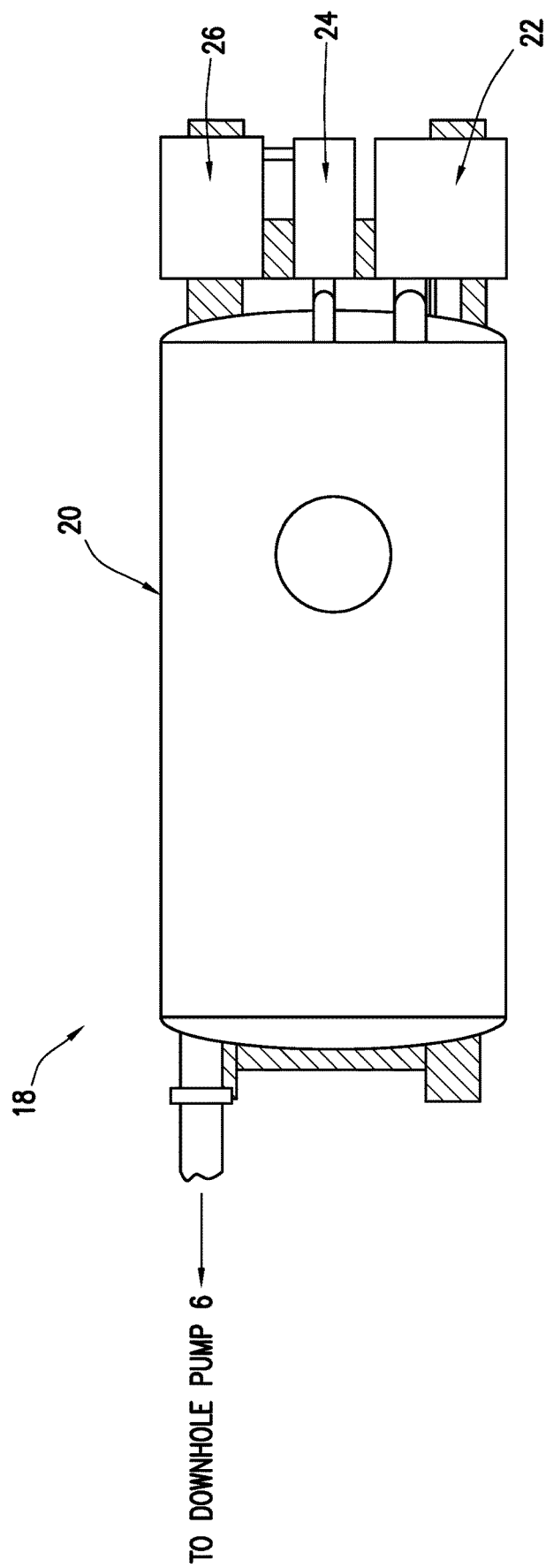
FIG. 2B illustrates an example self-contained delivery system that may be used in the delivery of an extended-life cement composition into a wellbore.

Referring now to FIG. 2B, the delivery system for some examples may include a self-contained delivery system 18 which may comprise a storage tank 20, circulating pump 22, liquid additive system 24, and additive tank 26. The circulating pump 22 may be used to re-circulate the extended-life cement composition in the storage tank 20. The liquid additive system 24 (which may include a pump, for example) may be used to deliver additives from additive tank 26 to the extended-life cement composition in the storage tank 20.

Figure 3:
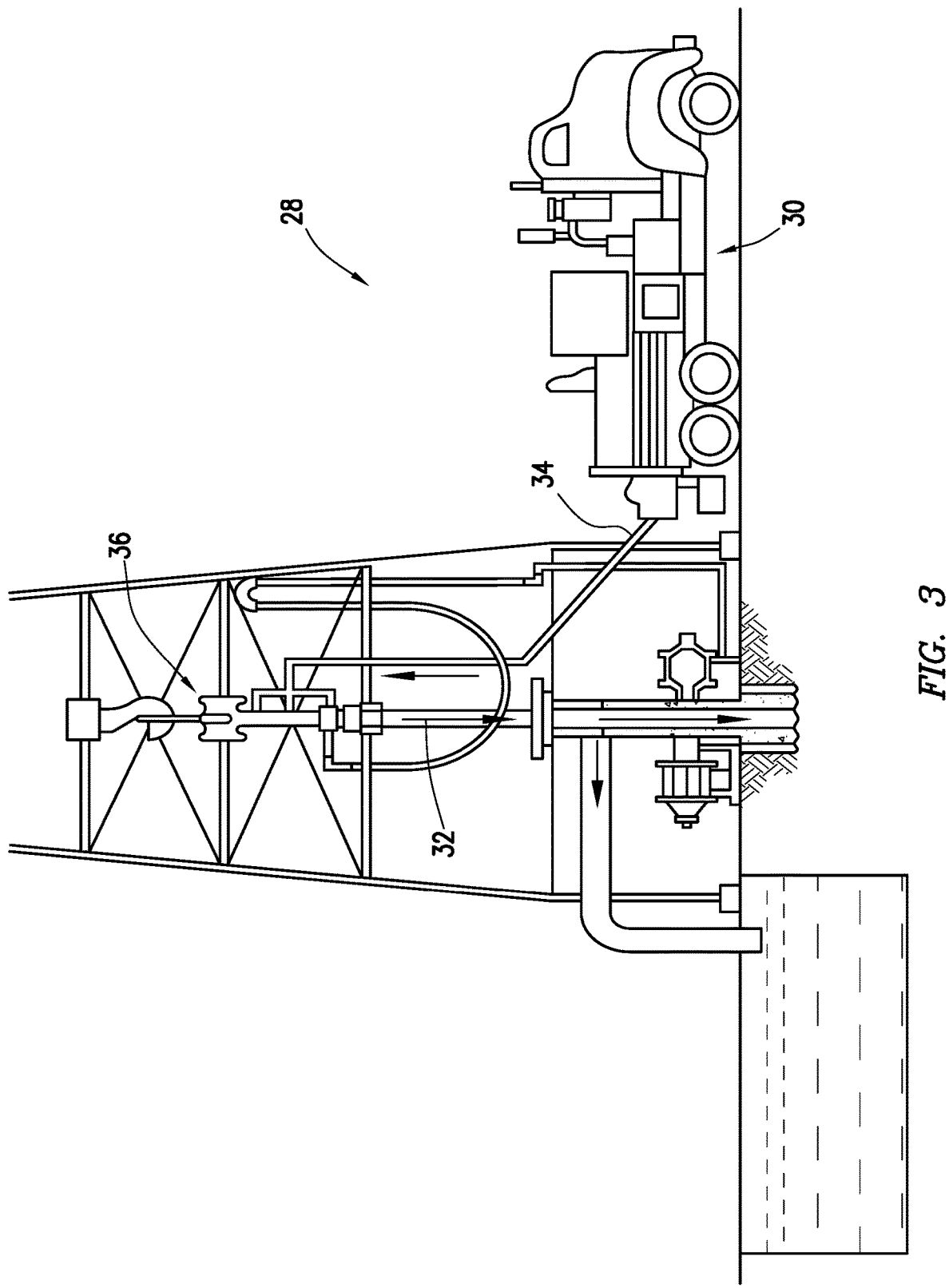
FIG. 3 illustrates an example of surface equipment that may be used in the placement of an extended-life cement composition.

FIG. 3 illustrates surface equipment 28, which may be used in the placement of an extended-life cement composition in accordance with certain examples. It should be noted that while FIG. 3 generally depicts a land-based operation, those skilled in the art will readily recognize that the principles described herein are equally applicable to subsea operations that employ floating or sea-based platforms and rigs, without departing from the scope of the disclosure. As illustrated by FIG. 3, the surface equipment 28 may include a cementing unit 30, which may include one or more cement trucks. The cementing unit 30 may include mixing equipment 4 and pumping equipment 6 (e.g., FIG. 1) as will be apparent to those of ordinary skill in the art. The cementing unit 30 may pump an extended-life cement composition 32 through a feed pipe 34 and to a tubing connection 36 which conveys the extended-life cement composition 32 downhole.

An example technique for placing an extended-life cement composition 32 across a set of open perforations and/or a casing leak 38 will be described with reference to FIG. 4. The extended-life cement composition 32 may be placed across the open perforations and/or a casing leak 38. As illustrated, a cement retainer or squeeze packer 40 may be ran to a depth above the open perforations and/or casing leak 38 and set on either wireline or tubing 42. While wellbore 44 is shown extending generally vertically into the subterranean formation 46, the principles described herein are also applicable to wellbores that extend at an angle through the subterranean formation 46, such as horizontal and slanted wellbores. As illustrated, the wellbore 44 comprises walls 48. In the illustrated example, a casing 50 has been inserted into the wellbore 44. The casing 50 may be cemented to the walls 48 of the wellbore 44 by cement sheath 52.

Figure 4:
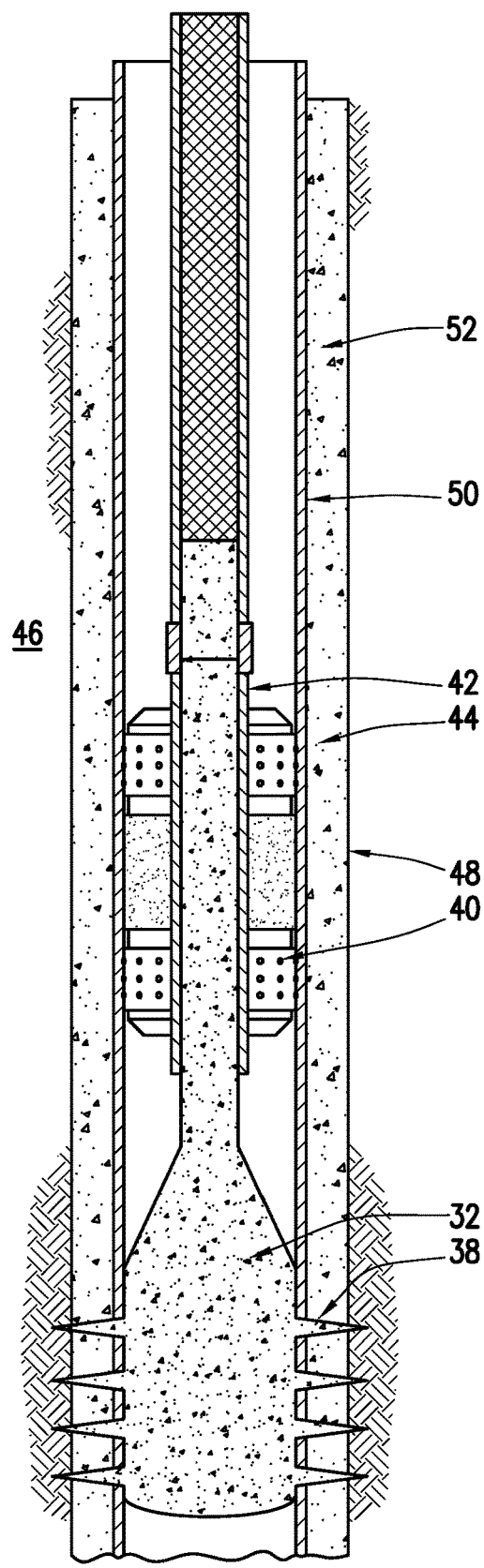
FIG. 4 illustrates an example for the placement of an extended-life cement composition across a set of open perforations and/or a casing leak.

With continued reference to FIG. 4, the extended-life cement composition 32 may be pumped down the interior of the tubing 42. The extended-life cement composition 32 may be allowed to flow down the interior of the tubing 42 through the cement retainer or squeeze packer 40 at the bottom of the tubing 42 and down across and into the open perforations and/or casing leak 38. The extended-life cement composition 32 may be allowed to set inside the casing 50, for example, to form a plug that seals the open perforations and/or casing leak 38 in the wellbore 44. While not illustrated, other techniques may also be utilized for introduction of the extended-life cement composition 32. By way of example, open ended tubing and/or drill pipe may be used to place the extended-life cement composition 32 across the open perforations and/or casing leak 38.

Figure 5:
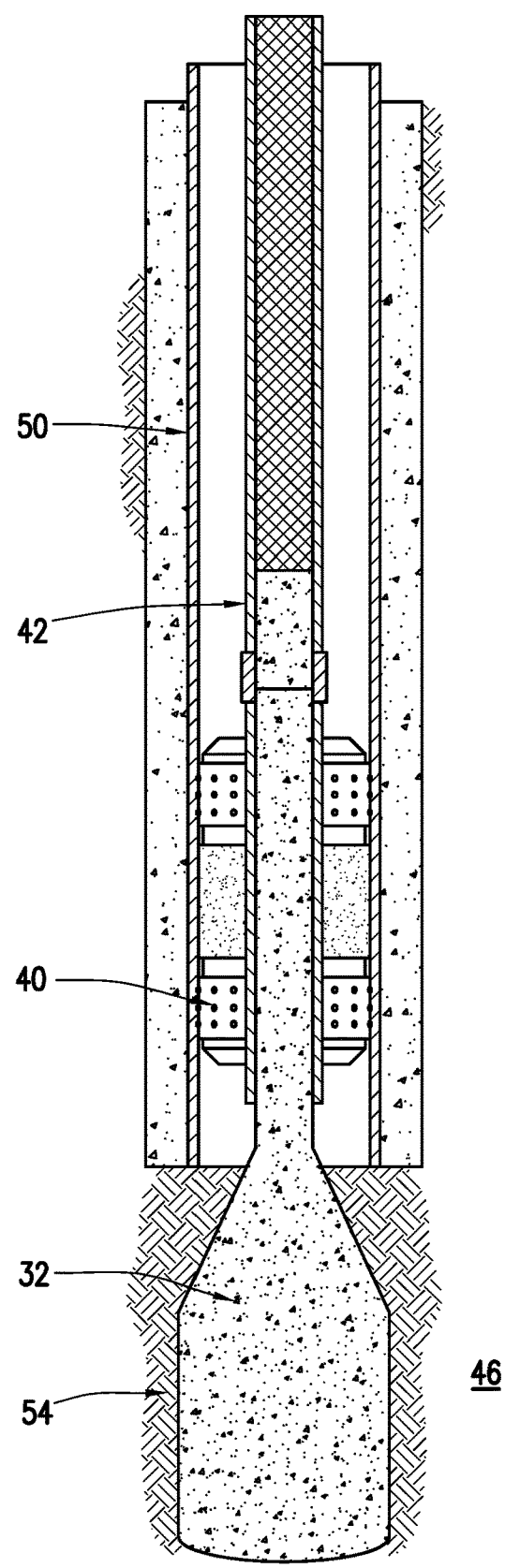
FIG. 5 illustrates an example for the placement of an extended-life cement composition within an openhole section.

FIG. 5 illustrates an example comprising the placement of the extended-life cement composition 32 within an openhole section 54 to isolate the formation 46 below. FIG. 5 shows the extended-life cement composition 32 inside the openhole section 54, but the extended-life cement composition 32 may at times enter into the casing 50 above. As with the example described in FIG. 4, the extended-life cement composition 32 may be pumped through the drillpipe and/or tubing 42 and a cement retainer or squeeze packer 40. Without limitation, the drillpipe and/or tubing 42 may be open ended.

Figure 6:
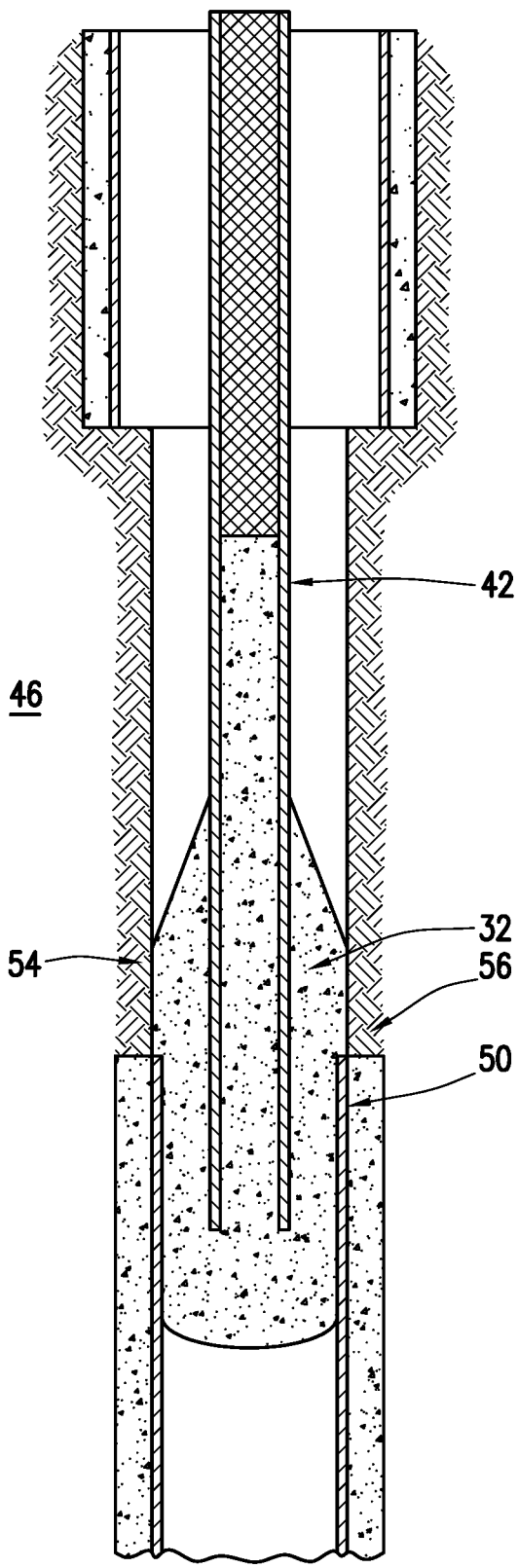
FIG. 6 illustrates an example for the placement of an extended-life cement composition across the top of a fish and/or casing stub.

FIG. 6 illustrates an example comprising the placement of a cement plug across the top of well equipment, such as a fish and/or casing stub 56. The extended-life cement composition 32 may be spotted through an open ended drillpipe or tubing 42. The bottom of the extended-life cement composition 32 may be placed at a predetermined distance into the casing 50 and back up into the openhole section 54 above the casing stub 56.

Figure 7:
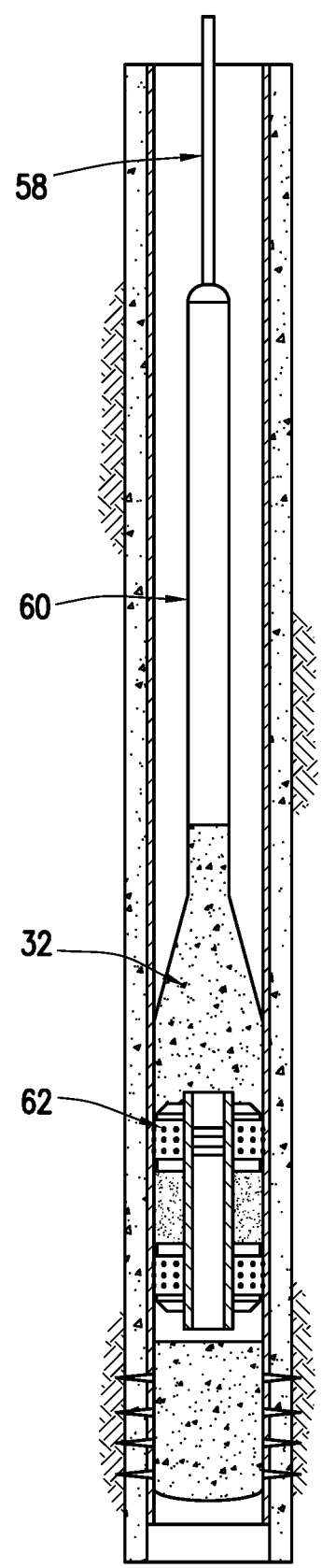
FIG. 7 illustrates an example for the placement of an extended-life cement composition utilizing a wireline deployed dump bailer.

FIG. 7 illustrates an example comprising the setting of a cementing plug utilizing a wireline 58 deployed dump bailer 60. As illustrated, the extended-life cement composition 32 may be placed above either a fish or bridge plug 62. The extended-life cement composition 32 may be pre-mixed and placed inside the dump bailer 60. The dump bailer 60 may then be ran to the necessary depth via wireline 58 and either dumped via a remotely operated valve located at the bottom of the dump bailer 60 or a class of ceramic disk may be broken by bumping it against the bottom of the hole. Once the extended-life cement composition 32 is removed from the dump bailer 60, the dump bailer 60 may be pulled back to the surface and additional runs may be performed if necessary.

Figure 8:
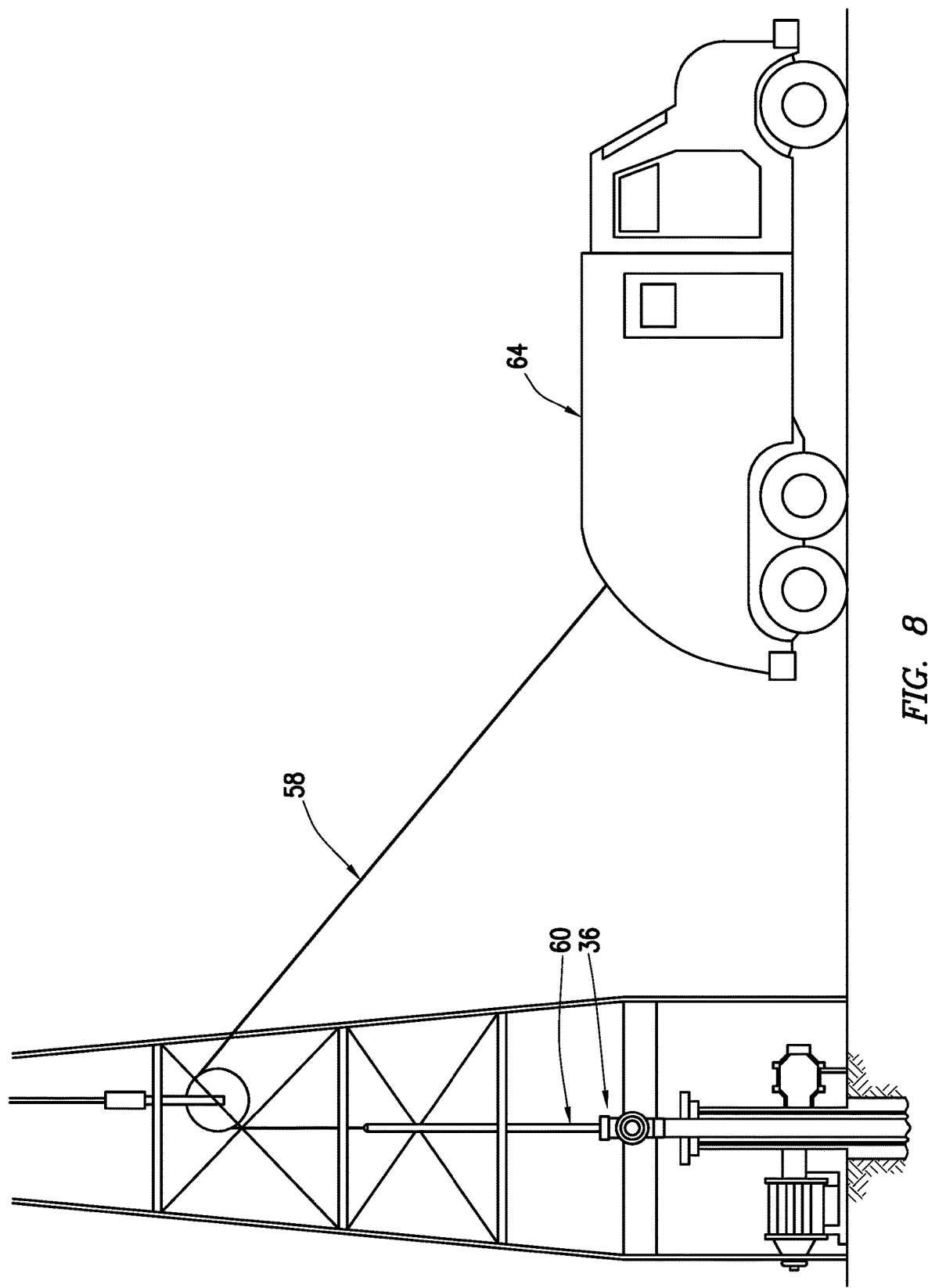
FIG. 8 illustrates an example of surface equipment comprising a wireline dump bailer for placement of an extended-life cement composition.

FIG. 8 illustrates an example of a standard surface rig for a dump bailer 60 operation. As illustrated, a wireline truck 64 or skid may be utilized to lower the dump bailer 60 through the tubing connection 36 via either electric wireline 58 or slickline.

Without limitation, the extended-life cement composition alternatively may be placed utilizing coiled tubing as the means of conveyance instead of sectioned tubing. This means of conveyance can be utilized to perform any of the job types as described above.

The exemplary extended-life cement compositions disclosed herein may directly or indirectly affect one or more components or pieces of equipment associated with the preparation, delivery, recapture, recycling, reuse, and/or disposal of the disclosed extended-life cement compositions. For example, the disclosed extended-life cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary extended-life cement compositions. The disclosed extended-life cement compositions may also directly or indirectly affect any transport or delivery equipment used to convey the extended-life cement compositions to a well site or downhole such as, for example, any transport vessels, conduits, pipelines, trucks, tubulars, and/or pipes used to compositionally move the extended-life cement compositions from one location to another, any pumps, compressors, or motors (e.g., topside or downhole) used to drive the extended-life cement compositions into motion, any valves or related joints used to regulate the pressure or flow rate of the extended-life cement compositions, and any sensors (i.e., pressure and temperature), gauges, and/or combinations thereof, and the like. The disclosed extended-life cement compositions may also directly or indirectly affect the various downhole equipment and tools that may come into contact with the extended-life cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present claims, the following examples of certain aspects of the disclosure are given. In no way should the following examples be read to limit, or define, the entire scope of the claims.

Example 1

An extended-life cement composition sample (Sample 1) was obtained which comprised about 40% to about 70% calcium aluminate cement by weight, about 33% to about 200% water by weight, about 0.01% to about 10% cement set retarder by weight, and about 0.01% to about 5% dispersant by weight. In the examples, the terms "by weight" or "by wt." refers to by weight of the extended-life cement composition. The extended-life cement composition was obtained from Kerneos, Inc., Chesapeake, Va.; as a retarded calcium-aluminate system comprising a suspension of calcium-aluminate cement that was 40-70% solids. The calculated density of the extended-life cement composition was 14.68 lb/gal.

The apparent viscosities and FYSA decay readings of Sample 1 was measured at Day 0 and after storage at day 48 using a Model 35A Fann® Viscometer and a No. 2 spring with a Fann® Yield Stress Adapter (FYSA), in accordance with the procedure set forth in API RP Practice 10B-2, Recommended Practice for Testing Well Cements. The data is presented in Table 1 below.

TABLE 1

Extended-Life Cement Composition Rheological Profile

| | FYSA Readings | | | | | | | |
|---|---|---|---|---|---|---|---|---|
| | 3 | 6 | 100 | 200 | 300 | 600 | 3D | 6D |
| Day 0 | 17759 | 10212 | 1305 | 839 | 666 | 506 | 7 | 4 |
| Day 48 | 16871 | 9768 | 1265 | 806 | 644 | 506 | 5.5 | 5.5 |

As shown by these measurements, the Sample 1 rheology remained stable for at least 48 days with little to no change in the calculated apparent viscosity. No settling of solids or free fluid was observed in Sample 1 over the test period further supporting the high degree of stability.

Example 2

A cement set activator and a cement set accelerator were added to the extended-life cement composition of Example 1 (Sample 1) to activate and accelerate its setting respectively to form Sample 2. The cement set activator was a 4.2 M sodium hydroxide solution added at a concentration of 2% by weight of the total composition. The cement set accelerator was a lithium salt (lithium sulfate monohydrate) and was added to the Sample 1 composition at a concentration of 1% by weight of the total composition. The density of Sample 2 was 14.5 lb/gal.

The non-destructive compressive strength of Sample 2 was measured using a UCA™ Ultrasonic Cement Analyzer, available from Fann Instrument Company, Houston, Tex. Compressive strength values may be determined in accordance with API RP 10B-2, Recommended Practice for Testing Well Cements, First Edition, Jul. 2005*. Compressive strength measurements were taken at 12 hours, 24 hours, 48 hours, 72 hours, 5 days, and 7 days. Additionally, the time to 50 psi and the time to 500 psi was noted. The data is shown in Table 2 below.

TABLE 2

Extended-Life Cement Composition Compressive Strength Measurements

| | Sample 2 |
|---|---|
| 50 psi (hh:mm) | 2:26:30 |
| 500 psi (hh:mm) | 12:26:30 |
| 12 hr. UCA CS (psi) | 479 |
| 24 hr. UCA CS (psi) | 1090 |
| 48 hr. UCA CS (psi) | 2537 |
| 72 hr. UCA CS (psi) | 3006 |
| 5 day UCA CS (psi) | 3043 |
| 7 day UCA CS (psi) | 2945 |

*Test Conditions: 100° F., 3000 psi, 15 minute ramp time

The data indicates that the extended-life cement compositions may build sufficient compressive strength at 7 days even in low temperatures.

Example 3

The sample of Example 2 (Sample 2), including the 4.2 M solution of sodium hydroxide and the lithium sulfate monohydrate, was used in a further experiment where a polyphosphate, specifically sodium hexametaphosphate, was added to Sample 2 to produce Sample 3. The sodium hexametaphosphate was added at a concentration of 3.7% by weight of the total composition. The density of Sample 3 was 14.5 lb/gal.

The non-destructive compressive strength of Sample 3 was measured using a UCA™ Ultrasonic Cement Analyzer, available from Fann® Instrument Company, Houston, Tex. Compressive strength values may be determined in accordance with API RP 10B-2, Recommended *Practice for Testing Well Cements*, First Edition, Jul. 2005*. Compressive strength measurements were taken at 12 hours, 24 hours, 48 hours, 72 hours, 5 days, and 7 days. Additionally, the time to 50 psi and the time to 500 psi was noted. The data is shown in Table 3 below.

TABLE 3

Extended-Life Cement Composition Compressive Strength Measurements

| | Sample 3 |
|---|---|
| 50 psi (hh:mm) | 2:06:00 |
| 500 psi (hh:mm) | 7:40:00 |

TABLE 3-continued

Extended-Life Cement Composition
Compressive Strength Measurements

|  | Sample 3 |
|---|---|
| 12 hr. UCA CS (psi) | 627 |
| 24 hr. UCA CS (psi) | 810 |
| 48 hr. UCA CS (psi) | 2279 |
| 72 hr. UCA CS (psi) | 5539 |
| 5 day UCA CS (psi) | 5535 |
| 7 day UCA CS (psi) | 4569 |

*Test Conditions: 100° F., 3000 psi, 15 minute ramp time

The data indicates that the extended-life cement compositions build sufficient compressive strength at 7 days even in low temperatures. Further, the addition of a polyphosphate in Sample 3 shows an improvement in compressive strength and a decrease in thickening times as compared to the same composition without a polyphosphate (Sample 2 in Example 2). The decrease at the 7 day period may be due to phase changes in the calcium aluminate cement over the curing period.

Example 4

Four samples identical to that used in Example 1 (Sample 1) were activated by the addition of a 4M NaOH (aq.) solution. The thickening times of the four samples and a control sample were measured on a high-temperature high-pressure consistometer by ramping from room temperature (e.g., about 70° F. for this example) and ambient pressure to 100° F. and 3000 psi in 15 minutes in accordance with the procedure for determining cement thickening times set forth in API RP Practice 10B-2, *Recommended Practice for Testing Well Cements*, First Edition, Jul. 2005. The thickening time is the time for the extended-life cement composition to reach 70 Bc and may be reported as the time to reach 70 Bc. Additionally, the pH of each sample was measured after each sample had been activated. The results of this test are set forth below in Table 4.

TABLE 4

Extended-Life Cement Composition Thickening Time Measurements

| Cement Set Activator Amount (% by wt.) | Thickening Time (hrs.) | pH |
|---|---|---|
| 4 | 2 | 12.3 |
| 2 | 6 | 10.6 |
| 1.5 | 19 | 9.6 |
| 1 | 190+ | 8.5 |
| 0 | — | 6.3 |

It was discovered that control over thickening times may be achieved by varying the concentration of the activator. The results indicate a dependence on concentration of the activator and the pH of the activated extended-life cement composition.

The preceding description provides various embodiments of the systems and methods of use disclosed herein which may contain different method steps and alternative combinations of components. It should be understood that, although individual embodiments may be discussed herein, the present disclosure covers all combinations of the disclosed embodiments, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A method of cementing comprising:
providing an extended-life cement composition comprising calcium aluminate cement, water, and a cement set retarder, wherein the cement set retarder is present in an amount of about 0.01% to about 10% by weight of the extended-life cement composition;
storing the extended-life cement composition in a vessel for a time period of at least about 7 days or longer,
mixing the extended-life cement composition with a cement set activator to activate the extended-life cement composition;
introducing the activated extended-life cement composition into a wellbore; and
allowing the activated extended-life cement composition to set in the wellbore to form a plug in the wellbore that has a permeability of less than 0.1 millidarcy, the composition having a 7-day compressive strength of 4,000 psi or greater.

2. The method of claim 1, wherein the cement set retarder is selected from the group consisting of hydroxycarboxylic acids or their respective salts, boric acid or its respective salt, and any combination thereof.

3. The method of claim 1, wherein the composition further comprises a polyphosphate.

4. The method of claim 3, wherein the polyphosphate is sodium hexametaphosphate.

5. The method of claim 3, wherein the polyphosphate is present in an amount of about 1% to about 30% by weight of the extended-life cement composition.

6. The method of claim 1, wherein the cement set activator is selected from the group consisting of Groups IA and IIA hydroxides, alkaline aluminates, Portland cement, and any combination thereof; wherein the cement set activator is present in an amount of about 0.01% to about 10% by weight of the extended-life cement composition.

7. The method of claim 1, wherein the extended-life cement composition further comprises at least one lithium salt selected from the group consisting of lithium sulfate, lithium carbonate, and any combination thereof.

8. The method of claim 1, wherein the subterranean formation adjacent to the plug has a temperature of about 100° F. or less.

9. The method of claim 1, wherein the extended-life cement composition further comprises sodium hexametaphosphate; and wherein the sodium hexametaphosphate is present in an amount of about 1% to about 30% by weight of the extended-life cement composition.

10. The method of claim 1, wherein the composition has a thickening time from about 2 hours to at least about 190 hours or more.

* * * * *